Sept. 21, 1965

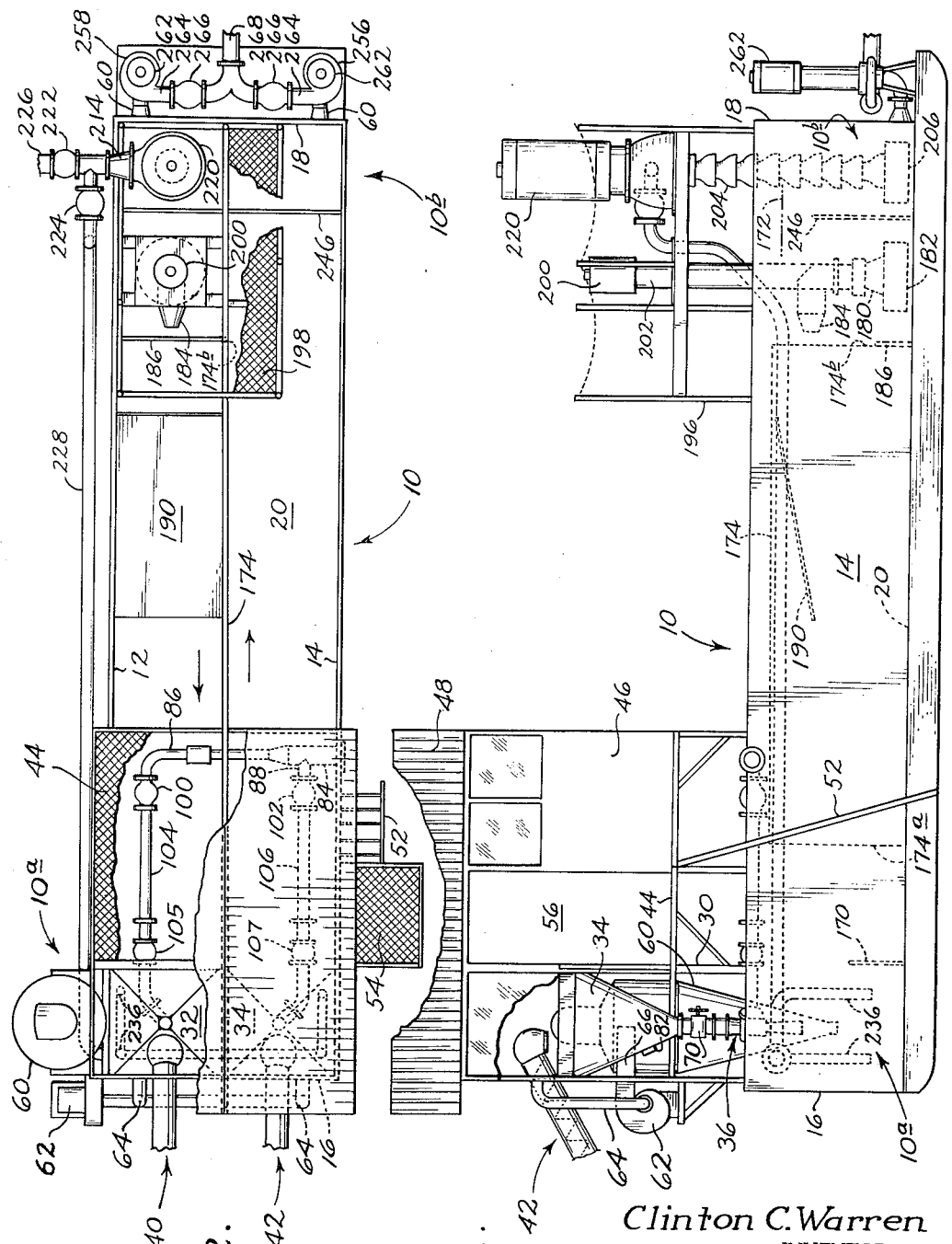

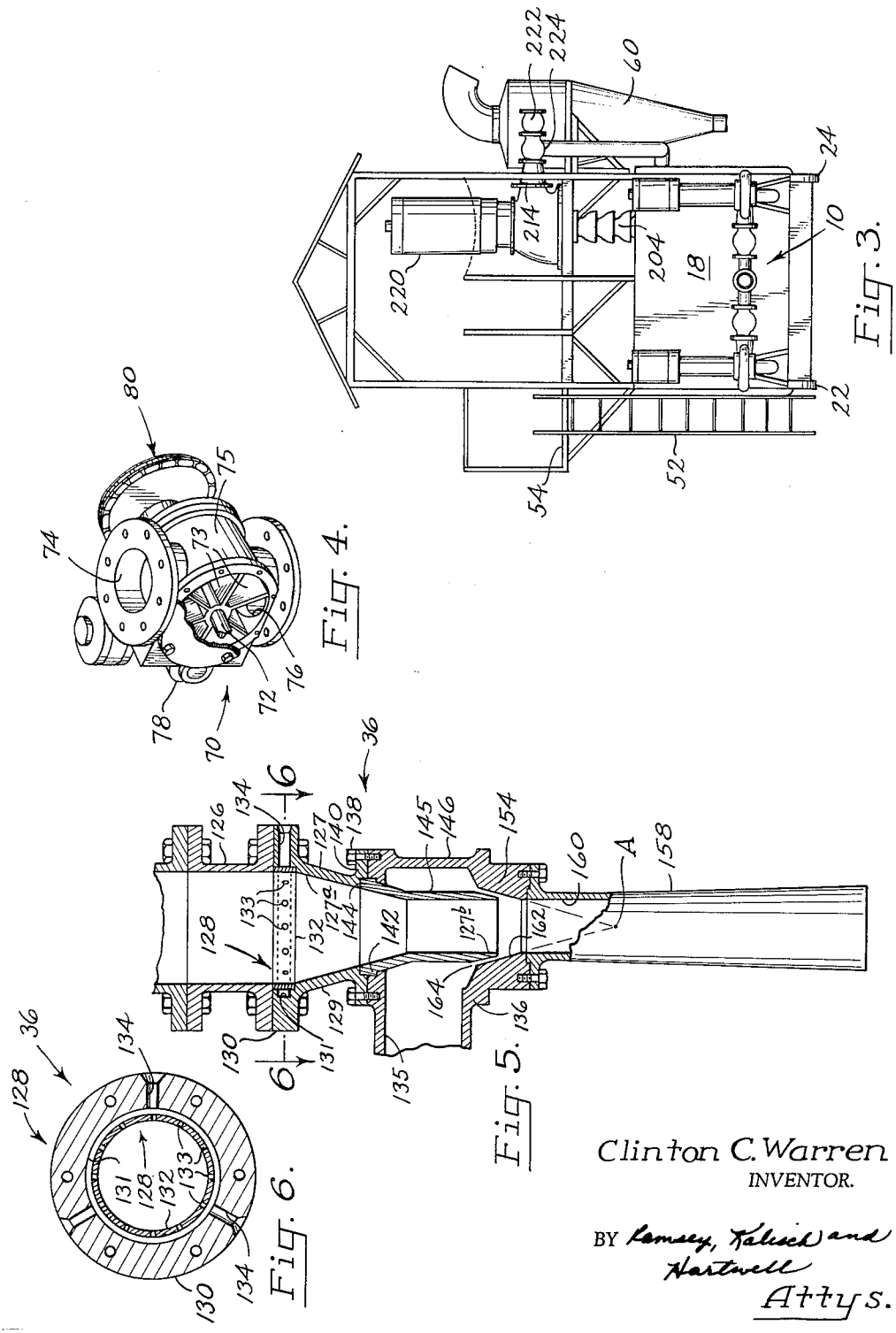

C. C. WARREN 3,207,485

APPARATUS FOR PRODUCING LIQUID MIXTURE

Filed June 1, 1964

Clinton C. Warren
INVENTOR.

BY Ramsey, Kalisch and
Hartwell
Attys.

United States Patent Office 3,207,485
Patented Sept. 21, 1965

3,207,485
APPARATUS FOR PRODUCING LIQUID MIXTURE
Clinton C. Warren, Milwaukie, Oreg., assignor to Cornell Manufacturing Co., Milwaukie, Oreg., a corporation of Oregon
Filed June 1, 1964, Ser. No. 371,680
16 Claims. (Cl. 259—4)

This invention relates to apparatus for producing liquid mixtures, such as may be used to produce thoroughly mixed slurries from liquid and particulate materials.

The invention is described herein in connection with the making of slurries from bentonite and water. Such slurries have utility in the construction of dams and other structures, as a material for filling trenches whereby the trenches may operate to dam influent water. The slurries also have other uses such as, for example, a blanketing material for fighting fires. While the invention is described in connection with the making of bentonite slurries, it is not intended thereby to limit the invention in all respects to such a slurry manufacture, as the apparatus contemplated has certain features which make it well suited for the production of mixtures of predetermined and uniformed concentration.

Bentonite (sodium montmorillonite) is a clay found in the Western United States, which forms a colloidal solution when it is mixed with water. When powdered bentonite is mixed with water, the bentonite goes into colloidal suspension, with the particles in the suspension adding weight to the fluid mass. A bentonite slurry is a low viscosity mixture, with a specific gravity greater than pure water. The colloidal solution has the peculiar characteristic of "setting up" if left undisturbed, whereby a gelled mass is formed. Thus, a bentonite slurry has thixotropic properties. These various characteristics have made bentonite useful in such industries as the petroleum industry and heavy construction industry, where a trench containing a mixture of bentonite and water may be effectively used to impede the inflow of water past the trench from a surrounding water table.

In these and other uses it is important that slurry compositions be produceable which have a known and uniform concentration of bentonite. Variations in bentonite concentration produce changes in the properties of the slurries which are undesirable. In many instances, clean slurries relatively void of sand and other materials are preferable. Generally speaking, the most useful slurries result only after a thorough mixing. In this connection, it has been noted that bentonite slurries, if not thoroughly mixed, will tend to undergo some separation, whereby a relatively heavy bentonite sludge will separate from and become concentrated beneath a superimposed less dense layer.

Another consideration which should be mentioned here is that bentonite swells when wetted, and has water-absorbing properties. Thus, bentonite, when mixed with water, should be subjected to a hydration period, to enable relative complete absorption of water to take place, whereby a more stable colloidal suspension may be produced. With well mixed slurries, the hydration time required to obtain the required absorption is substantially less than with slurries that are inadequately mixed. It follows that the capacity of a tank needed to hold a bentonite slurry during hydration is reduced if hydration time is made as fast as possible by first thoroughly mixing the slurry.

Generally, an object of this invention is to provide improved apparatus for producing liquid mixtures, which takes care of the above indicated problems in a highly satisfactory and practical manner.

More specifically, an object is to provide improved apparatus for making liquid mixtures, which includes a tank, and features novel means for premixing the constituents forming the mixture prior to their being introduced to the tank.

Another object is to provide such apparatus, which is operable to produce a constant flow of mixed material by constantly withdrawing from separate sources the constituents used in the mixture and then mixing these, such withdrawal of constituents being at a uniform rate whereby the concentration of the mixture produced is known and uniform over a period of time.

Another object is to provide improved apparatus which may be operated to produce a continuous supply of slurry from liquid and particulate materials, the slurry being characterized by a uniform concentration.

A further object is to provide portable apparatus for preparing liquid mixtures, which features a tank, means for introducing constituents at regulated rates to the tank, means for circulating the mixture in the tank, and means for withdrawing liquid mixture from the tank. As contemplated herein, the apparatus is ideally suited for construction jobs, where it is convenient to have a plant which may be readily moved from one spot to another.

In slurries such as bentonite slurries, the bentonite, as already indicated, hydrates on being mixed with water, and the time required for complete hydration depends upon how thoroughly the constituents are mixed. An object of this invention is to provide novel means relying upon water pressure to produce relatively complete and thorough mixing of the bentonite and water before their introduction to a holding tank, whereby the retention time in the tank required for complete hydration is reduced to a minimum. This permits a relatively small tank to be used to hold the slurry during hydration, which is an important advantage in units which are designed to be moved from one place to another.

Another object is to provide a novel circulating system for a holding tank in such apparatus, whereby sludge formation is inhibited by continuously intermixing slurry in the tank prior to its being removed therefrom. This results in a usable slurry of uniform consistency.

A still further object of this invention is to provide apparatus for producing and dispensing slurries which includes a pump for pumping slurry at high pressure, this pump being usable either to augment the usual circulating system in producing complete mixing and low retention times, or to feed slurry at high pressure to a jet-producing nozzle. In construction jobs, a high pressure jet of slurry is often used, for instance, in finally cleaning off the surface of a rock formation, once digging has exposed the formation.

According to this invention, automatic control means may also be provided to effect continuous withdrawal of slurry from a holding tank at the same rate as newly mixed slurry is introduced to the tank. This contributes to uniformity in the concentration of slurry mixtures.

Other objects and advantages are attained by the invention, and these will become more apparent as the following description is read in conjunction with the accompanying drawings, wherein:

FIG. 1 is a side elevation of mixing apparatus according to an embodiment of the invention, said apparatus including a holding tank, and means adjacent opposite ends of the tank for introducing premixed slurry, and withdrawing slurry after a retention time, respectively;

FIG. 2 is a top plan view of the apparatus illustrated in FIG. 1, with portions broken away to illustrate details;

FIG. 3 is an end elevation of the apparatus shown in FIG. 1;

FIG. 4 illustrates, in perspective, means contemplated for feeding particulate material at a uniform rate to mixer apparatus for producing an initial premixed slurry;

FIG. 5 illustrates, partly in cross section, mixer mechanism provided in the apparatus for mixing together liquid and particulate materials, and then continuously ejecting such a mixture into the holding tank;

FIG. 6 is a cross sectional view, taken generally along the lines 6—6 in FIG. 5, showing means whereby aeration of particulate material prior to mixing with liquid is produced;

Figure 7:
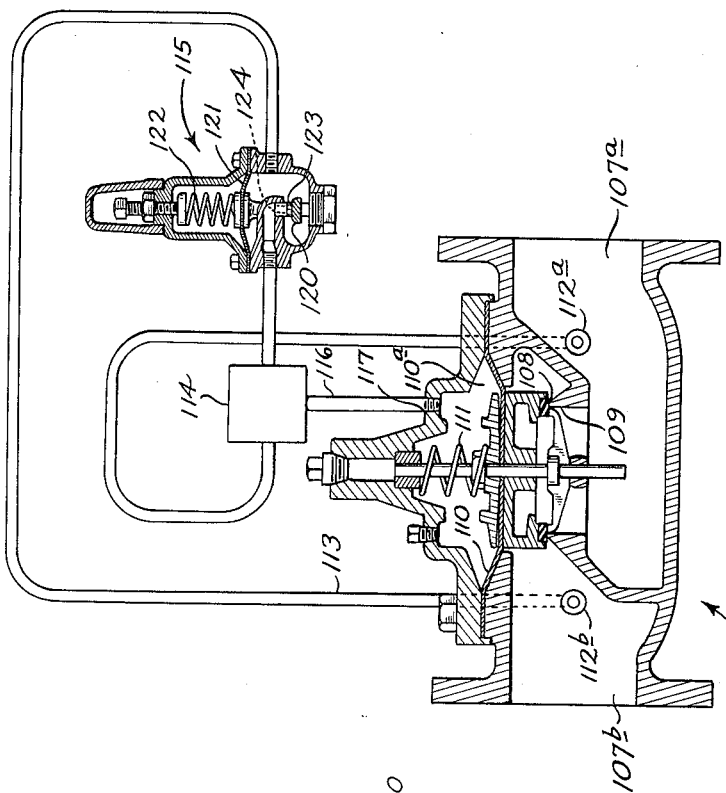
FIG. 7 illustrates a constant pressure outlet valve system such as may be incorporated in the means supplying liquid to the apparatus.

Referring now to the drawings, and first of all more particularly to FIGS. 1, 2, and 3, the apparatus illustrated comprises an elongated holding tank 10, having elongated opposed side walls 12, 14, end walls 16, 18, and a bottom 20. The tank is shown resting on longitudinals 22, 24 extending under the tank.

In the embodiment of the invention illustrated, particulate material, i.e., bentonite, and liquid, i.e., water are withdrawn from separate sources, thoroughly mixed with each other in a premixing step, and thence dumped into the tank in a mixing region adjacent one end of the tank. Mixed slurry, after a certain retention time and further mixing, is withdrawn from the opposite end of the tank. In the figures, the end of the tank where premixed slurry is introduced is indicated at 10a, and the end of the tank where slurry is withdrawn is indicated at 10b.

Considering first of all details of the mechanism whereby the particulate material and liquid are mixed together prior to being introduced in slurry form to the tank, supported above the end 10a of the tank, on framework 30, and positioned side-by-side on this framework, are a pair of hoppers 32, 34. These hoppers are utilized to hold a supply of granular material such as bentonite, before the same is fed into mixer mechanism or means disposed below the hoppers, exemplified by mixer 36 shown for hopper 34. Particulate material may be transported upwardly to fall into the open tops of the hoppers, by means of screw conveyors such as those shown at 40 and 42, respectively.

An enclosed operating deck 44 is provided which sits above tank 10 on framework 30. The deck may be surrounded by walls 46 and roof 48 forming an enclosure thereabove. The usual controls for the apparatus may be disposed within this enclosure, where they are protected from the elements. A ladder 52, entrance deck 54, and door 56 accommodate entrance into the enclosure by an operator.

Bentonite is a relatively fine powder, and upon such being deposited into the hopper by screw conveyors 40, 42, material tends to be suspended in the air in the space above the hoppers. In order that this material may be collected, a dust collector is shown at 60, which is mounted on one side of the tank. A blower 62 for the dust collector is connected by inlets 64 to the spaced above the hoppers, and conduit 66 connects the discharge from this blower to the dust collector.

An important part of this invention is the provision of mechanism operable continuously to produce a slurry of uniform and known concentration over a period of time. To achieve these ends, this invention contemplates mixer mechanism 36 for each hopper which vigorously mixes particulate and liquid material prior to such being discharged into the holding tank, and constant rate feed means for both the liquid and the particulate materials for feeding at uniform rate of flow these materials to the mixer mechanism. It is because of this constant rate of feed of materials, and the intimate premixing performed thereon, that a slurry of uniform concentration is produced in the holding tank, even though slurry is being continuously withdrawn from the tank.

Thus, for each of the hoppers 32, 34, and considering hopper 34, there is provided under the base thereof a feeder 70 for particulate material. As best shown in FIG. 4 where the feeder is illustrated with parts removed, the feeder comprises a power-driven shaft 72, upon which are mounted plural, equicircumferentially spaced vanes 73. At the top of the feeder, the feeder housing 75 is provided with an opening 74. This opening communicates with the interior of the hopper disposed above the feeder. A similar opening 76 is provided at the base of the feeder housing. Shaft 72 is rotated, together with vanes 73, by means of a motor 78 connected to the shaft by chain and sprocket assembly 80.

Motor 78, when energized, runs at a constant speed, and this results in the vanes being rotated within the housing of the device at a constant speed. Thus, the feeder is operable to measure out, successively and recurrently, predetermined volumes of particulate material which flow into the feeder through opening 74, each volume being equal to the space defined between the two adjacent vanes in the feeder. These are continuously ejected out the bottom of the feeder through opening 76. With free-flowing material such as bentonite, such a mechanism produces a highly accurate, metered flow of material. To insure that flow is continuous into the top of the feeder, and that no bridging or caking in the hopper occurs such as would affect the supply to the feeder, shaker mechanism of conventional design, such as that indicated at 82, (see FIG. 1) may be mounted on the side wall of each hopper.

In FIGS. 1 and 2, a conduit 84 is illustrated, through which water under pressure flows (i.e., the liquid used in making the slurry) on traveling to the mixer to be mixed with the particulate material emanating from the feeder. Conduit 84 connects through conduits 86 and 88 to a pair of shut off valves 100, 102. Conduit 104 extends from valve 100, and feeds fluid when valve 100 is open through valve 105 to the mixer mechanism below hopper 32. Conduit 106 extends from valve 102, and feeds fluid when valve 102 is open through valve 107 to the mixer mechanism below hopper 34. Each of valves 105, 107 is a constant pressure outlet valve, and as such each controls flow so as to supply water at a uniform rate to the mixer mechanism connected thereto, regardless of irregularities in the pressure of the water supply.

Referring to FIG. 7 where one of these valves, namely, valve 107, is shown in more detail, the inlet or upstream side of the valve is indicated at 107a, and the downstream or exhaust side at 107b. A ring 108 is movable toward and away from a seat 109, and controlling these movements is a diaphragm 110 and a spring 111 which biases the diaphragm and ring 108 so as to close the opening defined by valve seat 109. Connected to ports 112a and 112b in the valve casing are the ends of a conduit 113 which has an ejector 114 and a pressure reducing valve 115 between its ends. Connected to the ejector, and responsive to subatmospheric pressures produced therein by flow through the conduit 113, is a conduit 116, which connects with chamber 110a above diaphragm 110 in valve 107 through port 117.

As already indicated, the valve system described operates to produce a constant pressure on the downstream side regardless of irregularities of pressure on the upstream side. In pressure reducing valve 115, a yoke 120 operated upon by a diaphragm 121, biased by spring 122, moves downwardly upon a low pressure condition existing in port 112b and on the downstream side of valve 107, to move element 123 away from port 124 to open the port. This increases the flow through conduit 113, which is reflected by a lower subatmospheric condition in the ejector and conduit 116, which in turn is reflected in upward movement of diaphragm 110 in valve 107. As a consequence, ring 108 moves away from seat 109 to provide a greater flow through valve 105. This greater flow corrects the low pressure condition and tends to maintain a constant pressure condition. Obviously, with a high pressure condition on the downstream side, pressures result in the system tending to decrease flow through valve 105.

Mixer mechanism 36 which mixes together the particulate material fed by a feeder 70 and the water supplied through a flow control valve by way of supply conduit 84 is shown in more detail in FIGS. 5 and 6, and reference is now made to those figures. Prior to becoming mixed with water, particulate material falls into the mixer through a cylindrical section 126. From section 126, the material enters the mixer proper, through the large diameter end 127a of a nozzle portion 127.

In mixing the particulate material and liquid, the two constituents are violently agitated, by means to be described. It has been noted that optimum mixing results are obtained if the particulate material upon flowing into the nozzle portion is aerated, whereby a degree of separation in the granules thereof is produced. During operation of the mixer mechanism, a subatmospheric pressure is produced at the small diameter end 127b of nozzle portion 127, and this subatmospheric pressure is utilized to draw streams of air into the top of the nozzle portion, in an aeration zone indicated at 128.

More specifically, and describing this aeration zone, the top of the nozzle portion is defined by a fitting 129, and this fitting is provided at the top end thereof with an annular flange 130 through which it is connected with cylindrical section 126. Around the inner perimeter of this flange is a groove of substantially T-shaped cross section shown at 131. A portion of this groove provides a channel for seating a ring 132, which has provided therein a series of apertures 133 distributed about the circumference thereof. The remaining portion of this groove forms a channel about the outside of ring 132, through which air is supplied to these apertures. This channel is supplied air from outside the mixer mechanism by a series of radial bores 134 which extend through flange 130 and connect groove 131 with the perimeter of the flange.

Fluid, i.e., water, travels from a flow control valve such as valve 107 and into the mixer mechanism through passage 135 defined by a casing 136. The casing is attached, as by fasteners 138, to a flange 140 extending about the base of fitting 127. An annular channel 142 adjacent the top of casing 136 receives a flange 144 integral with the top of a part 145 which defines the base of nozzle 127.

Casing 136 includes a wall 146 that extends about and is spaced from the perimeter of part 145 of nozzle 127. Thus, a passage extends about the nozzle which communicates with the passage 135 through which water is fed into the mixer mechanism.

At the base of casing 136 and joined thereto is a collar portion 154. Fastened to the base of collar portion 154 is an elongated discharge cone 158, having a passage 160 extending down through the center thereof. It will be noted that collar portion 154 has a frustoconical inner wall 162 defining with the outside and base of the nozzle an annular passage 164 communicating with passage 135 and the passage extending about the nozzle. Passage 164 also communicates with passage 160 inside cone 158. Wall 162 and the outside and base of the nozzle converge progressing downwardly in FIG. 5. As a result, liquid, i.e., water flowing from passage 135 and through passage 164 into the cone is expelled into the cone at considerable velocity, in a curtain-like stream which converges at a point indicated approximately at A in FIG. 5. From this point downwardly, water escapes from the cone as a turbulent stream confined by the wall of the cone.

Water in traveling at a high velocity into the cone, produces a vacuum at the base of the nozzle which is effective to draw particulate material, and air admitted through apertures 133, downwardly through the nozzle. The air which rushes in through the apertures aerates the particulate material, and water and aerated particulate material are vigorously mixed together as they travel through the cone and out the base of the cone. In this way a thoroughly mixed initial mixture is produced which is discharged into the tank.

The mixer and associated structure just described may be supported over the tank by suitable bracket structure (not shown) mounting casing 136 on the tank.

An initial slurry mixture may be produced by the mixer mechanisms of both hoppers operating together, or by either mixer mechanism operating alone. Slurry is discharged from a mixer mechanism downwardly toward the floor of the tank with considerable force. As can be seen in FIG. 1, a wall 170 is provided which extends transversely of the tank, between side walls 12 and 14. This transverse wall, and side walls 12 and 14 together with tank end wall 16, are effective to confine liquid from immediate outward movement on striking the floor, so that such liquid must flow upwardly and over the top of wall 170 before moving out of the mixing region in the tank. In this way, additional mixing of the slurry takes place in the mixing region.

The tank holds a quantity of slurry, and in this way provides for a retention time whereby the slurry becomes hydrated before the same is removed from the tank. In making bentonite slurry, for instance, good results were noted with a tank having a size which was sufficient to hold approximately ten times the amount of slurry that could be removed during one minute. In this way slurry removed from the tank is first subjected to about a ten minute retention time. This retention time is more than adequate when there has been thorough mixing of the slurry before the same is introduced to the tank. A circulating system for circulating slurry in the tank is provided to promote complete mixing and hydration of the slurry, and such system will now be described in more detail.

Disposed midway between side walls 12 and 14 of the tank and extending upwardly to a point above the normal liquid level in the tank (such being indicated at 172) is a flow-divider wall 174. Wall 174 has ends 174a and 174b disposed inwardly somewhat from the end walls of the tank. This is to enable the slurry within the tank to move along one side wall, across the tank, and then along the other side wall, in the direction indicated by the arrows in FIG. 2. With circulating of the slurry in this manner, constantly, newly admitted slurry becomes mixed with slurry already in the tank, continuously, and further, there is a continuous mixing together of the constituents making up the slurry.

Referring again to FIGS. 1 and 2, adjacent end 10b of the tank, adjacent side wall 12 and between end 174b of the divider wall and end wall 18 of the tank is a turbine pump 180. A screen 182 covers the intake to the pump, which is adjacent tank bottom 20. The usual turbine parts (not shown) inside the pump housing, when rotated, are effective to draw slurry through the screen and up through the pump, and thence discharge the same through a pump discharge 184. A transverse wall 186, extending transversely of the tank between divider wall 174 and tank side wall 12, tends to block the flow of slurry into the intake of the pump from that portion of the tank which in FIG. 2 is shown above the divider wall. Thus this wall promotes the counterclockwise flow indicated in FIG. 2.

Bentonite, when mixed with water and before completely hydrated, exhibits a property of separating into a sludge, and mixture of somewhat less density which rises to the top of the sludge. Such sludge formation should be eliminated in order to obtain a truly uniform product. By having the intake of the pump adjacent the bottom or floor of the tank, any of such sludge is continuously pulled from the base of the tank, to be ejected into upper levels of slurry.

Mounted between side wall 12 and divider wall 174, between the ends of the flow-divider wall, is an inclined deflector wall 190. This deflector wall deflects the slurry emanating from the discharge of the pump downwardly, toward the floor of the tank, as said material moves toward the left end of the tank in FIGS. 1 and 2. This movement of the slurry further tends to inhibit the formation of any sludge blanket from forming along the base of the tank.

A superstructure 196 is provided, which supports a deck 198 in an elevated position over end 10b of the tank. This superstructure and deck provide a means for mounting a motor 200 which is utilized to drive turbine pump 180. Power transmitting means (not shown) within casing 202 connect the motor and the pump for drive purposes.

As already indicated earlier, bentonite slurry will displace water from an excavated trench, and in addition stop the inflow of water from any surrounding water table across the trench. Thus, in the construction of a dam or other structure, a preliminary step may comprise building a trench, which extends through porous ground down to bed rock. Ordinarily a cement floor may be placed on this bed rock before the trench is filled to perform its damming function. Prior to pouring such a floor, the bed rock should be thoroughly cleaned of dirt and sand, and for this purpose a jet stream of bentonite at high pressure may be used which, when directed on the bed rock, will wash away loose matter.

To produce this jet stream of slurry, at high pressure, the apparatus contemplated includes a high pressure or "jetting" pump, which is a multiple stage turbine pump, shown at 204. This pump also has a screen 206 over the intake thereof. The housing comprises successive bowls stacked one over another, and within each are the usual impeller blades. The insides of the bowls communicate with each other, and the blades are all mounted on a common drive shaft driven by a motor 220 supported on deck 198. The discharge for jetting pump 204 is indicated at 214. With the multiple in-line impeller blades, when the pump is operated, a stream of slurry is drawn up through the pump and ejected at high pressure out discharge 214.

As best shown in FIGS. 2 and 3, the discharge 214 of jetting pump 204 connects with a pair of shut-off valves 222, 224. Valve 222 may be opened and closed, to control the flow of slurry through a conduit 226 which leads to the jet (not shown) which may be employed to clean bed rock as described. Valve 224 may be opened and closed to control the flow of slurry through a conduit 228 which extends along the side of the tank toward end 10a thereof.

In certain instances it may be desirable to prepare a batch of slurry in as fast a time as possible. In other instances additional means may be desirable to produce more thorough mixing and hydration. The jetting pump may be used to promote faster mixing of the slurry, by directing the material discharged from the pump into the mixing region adjacent tank end 10a where new slurry is being admitted. Conduit 228 is provided to enable the return of slurry to the mixing region of the tank for these purposes.

As can be seen in FIGS. 1 and 2, a series of 236 are present in the mixing region of the tank, with lower open or exhaust ends adjacent the floor of the tank. These nozzles are all connected by a suitable conduit to the end of conduit 228. When the jetting pump, therefore, is used to produce fast mixing of a batch of slurry, valve 224 is opened, and the pump directs slurry from tank end 10b, at high pressure and through the nozzles, into the mixing region, with the fluid streams from these nozzles then producing additional mixing of slurry being freshly added to the tank.

Adjacent end 10b of tank 10, extending transversely between side walls 12 and 14, and between the jetting pump and pump 180, is a transverse wall 246. This wall may contain gate-controlled apertures (not shown) which may be opened to a varying extent to regulate the flow of slurry along the base of the tank and toward the intake of the jetting pump.

Adjacent end wall 18 and on the outside of the tank are mounted a pair of unloading pumps 256, 258. These are conventional impeller pumps, and include intakes 60 extending through the end wall which communicate with the interior of the tank. The pumps are driven by motors 262. The control for the motors is such that either one of the pumps can be operated alone, and independently of the other, or both pumps may be operated in unison. Both are operated together when it is desired to get the maximum rate of discharge from the tank. Each pump has a discharge 264 that connects through a valve 266 to a conduit 268, said conduit being common for both of the pumps. This conduit supplies slurry for final use.

Figure 8:
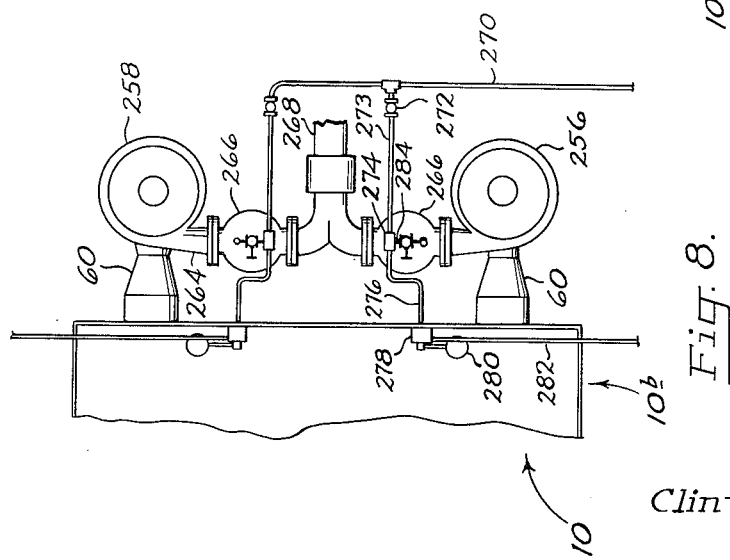
FIG. 8 illustrates a valve system which may be employed to control the rate at which slurry is withdrawn from a holding tank in the apparatus.

Referring to FIG. 8, here there is illustrated details of the valve system which may be provided to accommodate control of the outflow of slurry from holding tank 10. As can be seen in this figure, valves 266 are fluid powered, in the sense that the pressure of water flowing in a supply conduit 270 is utilized to actuate the valves.

Considering, for explanation purposes, pump 256 adjacent the bottom of the drawing in FIG. 8, at 272 is a stop cock which may be opened and closed to produce periods of flow and nonflow, respectively, through a conduit 273. Conduit 273 connects to an ejector 274, and from thence water flows through a conduit 276, through a float control valve 278 controlled by float 280, to a conduit 282. Ejector 274 on fluid flow therethrough produces a subatmospheric pressure which is reflected through a conduit 284 in the chamber above a diaphragm in fluid-powered valve 266, which may be similar in construction to valve 107 illustrated in FIG. 7.

Float 280 is responsive to the level of slurry within tank 10, and on upward movement in the tank, actuates valve 278 to increase the opening of the valve, which increases the flow through conduits 273, 276. This, then, produces a greater subatmospheric pressure in conduit 284, causing an increase in the opening of valve 266. With lowering of the float, the reverse takes place. Thus it may be seen that the float is operable to keep a constant discharge from the tank, whereby the level of slurry in the tank is kept constant. The control system for pump 258 is similar to the one just described for pump 256.

Using the apparatus, when a continuous supply of slurry is desired, by withdrawing slurry from the tank at substantially the same rate that slurry is introduced, greater uniformity in the slurry is achieved, since this produces a slurry which, on the average, has all been subjected to about same retention time in tank 10.

From the above, it should be obvious that novel apparatus is contemplated which is flexible in operation, and which can be employed to produce slurries of known and uniform concentration. The constituents which make the slurry or mixture are fed into the apparatus through mixture mechanism as described, in a continuous flow, and by means which produces a thorough mixing of the materials. The tank and other apparatus therein operate to produce thorough circulation of the slurry, further mixing during the hydration period. With control over the inflow, mixing, and outflow of materials, consistency is produceable in the final slurry produce. The apparatus may produce slurries at different rates, depending upon whether one or two mixer mechanisms are employed in mixing of the slurry, and fast mixing is possible using the jetting pump for recirculation purposes. The apparatus in the embodiment illustrated is portable, in the sense that it can be moved from one location to another, to provide the necessary slurries needed at these different locations.

The concentrations of different mixtures produced may be varied at will, by changing the amount of liquid added in the mixing process. Suitable flow indicators may indicate to the operator liquid flow at any time.

As used herein, "particulate material" includes powders, dusts, granular material, etc.

While there has been described an embodiment of the invention, variations and modifications are possible without departing from the invention. It is desired to cover all such variations and modifications as would be apparent to one skilled in the art and that come within the scope of the appended claims.

It is claimed and desired to secure by Letters Patent:

1. Mechanism for making and dispensing a liquid mixture from particulate and liquid constituents comprising
  a tank,
  pump means for circulating the liquid mixture within the tank,
  passage means for withdrawing the liquid mixture from the tank, and
  means for continuously adding the constituents in premixed form to the tank, said last-mentioned means comprising
  a mixer,
  constant rate feed means for feeding particulate material at a uniform rate of flow to the mixer,
  means for introducing a continuous flow of air to the particulate material fed into the mixer thus to aerate the material and produce an air mixture thereof,
  constant rate feed means for feeding liquid at a uniform rate of flow to the mixer, and
  discharge means through which premixed material is continuously ejected,
  said mixer including means whereby the liquid is introduced to the particulate material after the latter has been made into an air mixture, and
  means operating continuously to mix vigorously the liquid and air mixture of particulate material prior to such being discharged into the tank.

2. Mechanism for making and dispensing a liquid mixture from particulate and liquid constituents comprising
  a tank,
  pump means for circulating the liquid mixture within the tank,
  passage means for withdrawing the liquid mixture from the tank, and
  means for adding continuously the constituents in premixed form to the tank, said last-mentioned means comprising
  a mixer, including a nozzle having a large and a small diameter end,
  constant rate feed means for feeding particulate material at a uniform rate of flow to the mixer and into the large diameter end of said nozzle, and
  constant rate feed means for feeding liquid at a uniform rate of flow and under pressure against the periphery of the nozzle between its end and thence along the nozzle to the small diameter end thereof, with said liquid on passing beyond said small diameter end producing a subatmospheric pressure at said end which draws said particulate material through the nozzle,
  said mixer further including a cone receiving liquid and particulate material passing beyond the small diameter end of the nozzle with such being subjected to turbulent mixing therein, said cone having a discharge end positioned so as to discharge into said tank.

3. The mechanism of claim 2, which further comprises means for introducing a continuous flow of air to the particulate material fed into the mixer adjacent the large diameter end of said nozzle, such air aerating the granular material to produce an air mixture thereof which passes through the small diameter end of the nozzle.

4. Means for mixing particulate and liquid materials comprising
  a hopper for holding the particulate material,
  motor-driven constant rate feed means for withdrawing particulate material at a uniform rate from said hopper,
  a nozzle having large and small diameter ends receiving through its large diameter end particulate material withdrawn by said feed means,
  constant rate feed means for feeding liquid at a uniform rate of flow and under pressure to the periphery of said nozzle and thence along the nozzle to the small diameter end thereof, and
  a cone positioned to receive liquid and particulate material passing beyond the small diameter end of the nozzle, and constructed to produce turbulent mixing of the materials inside thereof.

5. Mechanism for making and dispensing a slurry from particulate and liquid materials comprising
  a tank,
  pump means for circulating slurry within the tank,
  means for continuously adding particulate and liquid materials in slurry form to the tank,
  said last-mentioned means comprising a mixer, constant rate feed means feeding particulate material at a uniform rate of flow to the mixer, and constant rate feed means for feeding liquid at a uniform rate of flow and under pressure to the mixer,
  said mixer including means whereby the flow of liquid under pressure therethrough produces vigorous mixing of the liquid and particulate material whereby a slurry is formed,
  means for withdrawing slurry from the tank, and
  means controlling said last-mentioned means whereby the level of the slurry within the tank may be kept substantially constant.

6. Mixing apparatus for producing liquid mixtures comprising
  a tank,
  means for withdrawing from separate sources liquid and particulate materials, mixing these materials, and then introducing them as a preformed mixture to the tank, and
  a pump for circulating liquid mixture in the tank,
  said pump producing upon actuation a swirl of liquid mixture along all four sides of the tank,
  said pump having an intake adjacent the base of the tank and a discharge adjacent the top of the tank, whereby a mixing of liquid at different levels is produced in addition to swirling of liquid around the sides of the tank.

7. Mechanism for producing and dispensing liquid mixtures comprising
  an elongated tank with opposed side and end walls,
  a flow-divider wall extending longitudinally of the tank intermediate the side walls thereof,
  means for continuously forming a liquid mixture and introducing the mixture into the tank adjacent one end thereof, and
  means for circulating liquid mixture in the tank disposed adjacent the end of the tank opposite its said one end, the last-mentioned means comprising
  a pump with a discharge end disposed adjacent a tank side wall and to one side of said flow-divider wall and operable to eject a liquid mixture so that a swirl is produced in the tank around the flow-divider wall.

8. Mechanism for making a liquid mixture from unmixed constituents comprising
  an elongated tank,
  means for initially mixing liquid and particulate materials and introducing the same into a region adjacent one end of said tank after initial mixing,
  a pump,
  an intake for the pump disposed in the tank adjacent the end of the tank opposite its said one end, and
  an outlet for said pump adjacent said one end of the tank constructed to expel liquid mixture pumped by the pump in a region adjacent said one end where the mixture is introduced to the tank from said mixing means.

9. Apparatus for preparing a slurry from particulate and liquid material comprising
an elongated tank with a base and opposed side and end walls,
a flow divider extending longitudinally of the tank spaced intermediate the side walls and projecting upwardly from substantially the base of the tank,
said flow divider having ends spaced inwardly from the end walls of the tank,
means for introducing a mixture of liquid and particulate material as a premixed slurry into one end of the tank in a mixing region adjacent said one end,
means adjacent the other end of the tank for circulating a slurry comprising a pump with inlet and outlet ends disposed so that slurry within the tank is circulated around the walls thereof and about said flow divider, and
a return pump having an inlet adjacent said one end of the tank and an outlet adjacent the other end of the tank in said mixing region, operable upon actuation to draw liquid from said one end and expel it into the mixing region together with newly introduced mixture.

10. The apparatus of claim 9, which further comprises means for premixing particulate and liquid material from separate sources prior to the same being introduced to the tank, and said premixing means comprising constant rate feed means for feeding particulate material at a uniform rate of flow, constant rate feed means for feeding liquid material at a uniform rate of flow, and mixer mechanism receiving materials from said two feed means producing vigorous mixing of the materials and discharging into said mixing region of the tank.

11. The apparatus of claim 10, which further comprises unloading pump means having an intake adjacent said other end of the tank, and a discharge end outside the tank, and control means operable to regulate the unloading pump means whereby slurry is removed from the tank at substantially the same rate that premixed slurry is introduced to said one end of the tank.

12. A portable bentonite slurry mixing plant comprising an elongated tank having a base and opposed side and end walls,
hopper means mounted above and supported by the tank for holding a supply of bentonite,
motor-driven constant rate feed means supported by the tank for withdrawing a metered flow of bentonite from said hopper,
a nozzle having large and small diameter ends receiving through its large diameter end bentonite withdrawn by said feed means,
another constant rate feed means for feeding a metered flow of water under pressure to the periphery of and thence along said nozzle past its said small diameter end, with said water producing on such flow subatmospheric pressure at said small diameter end, and
a cone receiving bentonite and water passing beyond said small diameter end of the nozzle, with such cone confining such materials while the same are subjected to turbulent mixing therein,
said cone having a discharge end feeding into the tank.

13. Means for mixing particulate and liquid materials comprising
a nozzle including a large diameter end, and below such end a small diameter end,
supply means for supplying particulate material to the large diameter end of the nozzle, whereby such may flow by gravity through the nozzle,
means adjacent the small diameter end of the nozzle for producing subatmospheric pressure within the nozzle, including means for producing a flow of liquid under pressure along the outside of the nozzle and over its said small diameter end, and
means for aerating particulate material supplied to said large diameter end of the nozzle comprising at least one aerating passage having an inner end communicating with the interior of the nozzle adjacent its said large diameter end, said passage having an end opposite said inner end which communicates with a source of air at a higher pressure than the pressure existing within said nozzle where said one end is located, the subatmospheric pressure produced within said nozzle being operable to produce a flow of air into said nozzle through said air passage.

14. The means of claim 13, wherein multiple air passages are provided, having inner ends communicating with the interior of the nozzle, and said inner ends are distributed circumferentially about the nozzle adjacent its said large diameter end.

15. Mechanism for making and dispensing a slurry, from particulate and liquid materials, comprising
a tank,
pump means for circulating a slurry within the tank,
a mixer,
constant rate feed means for feeding particulate material at a uniform rate of flow to the mixer,
constant rate feed means for feeding liquid at a uniform rate of flow and under pressure to the mixer,
said mixer including means whereby liquid and particulate material fed thereinto is processed continuously into a slurry and such is discharged into the tank at a uniform rate over a period of time,
means for withdrawing slurry from the tank, and
means controlling said last-mentioned means whereby the level of slurry within the tank is kept substantially constant.

16. Means for mixing particulate and liquid materials comprising
a hopper for holding the particulate material,
motor-driven constant rate feed means for withdrawing particulate material at a uniform rate from said hopper,
a nozzle having a large diameter end and a small diameter end positioned to receive through its large diameter end particulate material withdrawn by said feed means,
means adjacent the small diameter end of the nozzle for producing subatmospheric pressure within the nozzle, including means for producing a flow of liquid under pressure on the outside of the nozzle and over its said small diameter end, and
means for aerating particulate material supplied to said large diameter end of the nozzle, comprising at least one air passage communicating at one end with the interior of the nozzle adjacent the nozzle's large diameter end and communicating at an end opposite said one end with a source of air at a higher pressure than the pressure within said nozzle where said one end is located,
the subatmospheric pressure produced at said small diameter then being operable to produce flow of air into said nozzle through said air passage.

References Cited by the Examiner

UNITED STATES PATENTS

| 850,657 | 4/07 | Klein | 68—208 |
|---|---|---|---|
| 2,963,525 | 12/60 | Folz et al. | 259—95 |
| 2,992,084 | 7/61 | Schropp | 259—4 |

WALTER A. SCHEEL, *Primary Examiner.*

CHARLES A. WILLMUTH, *Examiner.*